(12) United States Patent
Yamaguchi

(10) Patent No.: US 11,064,313 B2
(45) Date of Patent: Jul. 13, 2021

(54) IN-VEHICLE WIRELESS COMMUNICATION DEVICE AND DISTANCE INFORMATION DETECTION METHOD

(71) Applicant: DENSO CORPORATION, Kariya (JP)

(72) Inventor: Taichi Yamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/775,088

(22) Filed: Jan. 28, 2020

(65) Prior Publication Data

US 2020/0169842 A1 May 28, 2020

Related U.S. Application Data

(63) Continuation of application No. PCT/JP2018/012624, filed on Mar. 28, 2018.

(30) Foreign Application Priority Data

Aug. 4, 2017 (JP) .............................. JP2017-151520

(51) Int. Cl.
| | | |
|---|---|---|
| *H04W 24/00* | (2009.01) | |
| *H04W 4/02* | (2018.01) | |
| *H04B 17/318* | (2015.01) | |
| *H04W 4/40* | (2018.01) | |
| *G01S 11/06* | (2006.01) | |
| *H04W 12/06* | (2021.01) | |
| *B60R 25/24* | (2013.01) | |
| *E05B 81/64* | (2014.01) | |

(52) U.S. Cl.
CPC ............. *H04W 4/023* (2013.01); *G01S 11/06* (2013.01); *H04B 17/318* (2015.01); *H04W 4/40* (2018.02); *H04W 12/06* (2013.01); *B60R 25/24* (2013.01); *B60R 2325/205* (2013.01); *E05B 81/64* (2013.01)

(58) Field of Classification Search
CPC ........ H04W 4/02; H04W 48/04; H04W 64/00
USPC .......................................... 455/456.1–6, 457
See application file for complete search history.

(56) References Cited

U.S. PATENT DOCUMENTS

| | | | |
|---|---|---|---|
| 2005/0124344 A1* | 6/2005 | Laroia .................. | H04W 36/18 455/436 |
| 2008/0139198 A1* | 6/2008 | Saitou .................. | H04W 24/06 455/424 |

(Continued)

FOREIGN PATENT DOCUMENTS

| | | |
|---|---|---|
| JP | 2003248045 A | 9/2003 |
| JP | 2011184918 A | 9/2011 |

(Continued)

*Primary Examiner* — Matthew W Genack
(74) *Attorney, Agent, or Firm* — Harness, Dickey & Pierce, P.L.C.

(57) ABSTRACT

An in-vehicle wireless communication device stores calibration information used in combination with a radio wave intensity of a mobile terminal in a state of identifying the mobile terminal, performs wireless communication with the mobile terminal in a state of identifying the mobile terminal, detects the radio wave intensity of a radio wave received from the mobile terminal during the wireless communication, and detects distance information to the mobile terminal based on the radio wave intensity of the radio wave received from the mobile terminal and the calibration information stored for the mobile terminal.

4 Claims, 10 Drawing Sheets

(56) References Cited

U.S. PATENT DOCUMENTS

| | | |
|---|---|---|
| 2015/0329081 A1 | 11/2015 | Morita |
| 2016/0231421 A1 | 8/2016 | Murakami |
| 2019/0003439 A1* | 1/2019 | Chaplow ................. B60R 25/24 |
| 2019/0090093 A1 | 3/2019 | Odejerte, Jr. |

FOREIGN PATENT DOCUMENTS

| | | |
|---|---|---|
| JP | 2015072244 A | 4/2015 |
| WO | WO-2017062448 A1 | 4/2017 |

\* cited by examiner

| AUTHORIZED TERMINAL IDENTIFICATION INFORMATION | CALIBRATION INFORMATION |
|---|---|
| TERMINAL IDa | CALIBRATION COEFFICIENT ka |
| TERMINAL IDb | CALIBRATION COEFFICIENT kb |
| TERMINAL IDc | CALIBRATION COEFFICIENT kc |
| — | — |

106

IN-VEHICLE WIRELESS COMMUNICATION DEVICE AND DISTANCE INFORMATION DETECTION METHOD

CROSS REFERENCE TO RELATED APPLICATIONS

The present application is a continuation application of International Patent Application No. PCT/JP2018/012624 filed on Mar. 28, 2018, which designated the U.S. and claims the benefit of priority from Japanese Patent Application No. 2017-151520 filed on Aug. 4, 2017. The entire disclosures of all of the above applications are incorporated herein by reference.

TECHNICAL FIELD

The present disclosure relates to an in-vehicle wireless communication device and a distance information detection method.

BACKGROUND

Techniques have been proposed for providing various services, such as unlocking (or preparation for locking) a door of a vehicle or illuminating a foot, upon detecting that a person carrying an electronic key approaches the vehicle. In those technologies, a wireless communication device (hereinafter referred to as an in-vehicle wireless communication device) is mounted on the vehicle, and the in-vehicle wireless communication device performs wireless communication with an electronic key, thereby detecting that a person carrying the electronic key approaches the vehicle. Then, it is authenticated whether the electronic key is an authorized electronic key, and when it is confirmed that the electronic key is the authorized electronic key, various services such as unlocking of the door are provided.

SUMMARY

According to an aspect of the present disclosure, calibration information used in combination with a radio wave intensity of a mobile terminal is stored in a state of identifying the mobile terminal, wireless communication is performed with the mobile terminal in a state of identifying the mobile terminal, the radio wave intensity of a radio wave received from the mobile terminal during the wireless communication is detected, and distance information to the mobile terminal is detected based on the radio wave intensity of the radio wave received from the mobile terminal and the calibration information stored for the mobile terminal.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
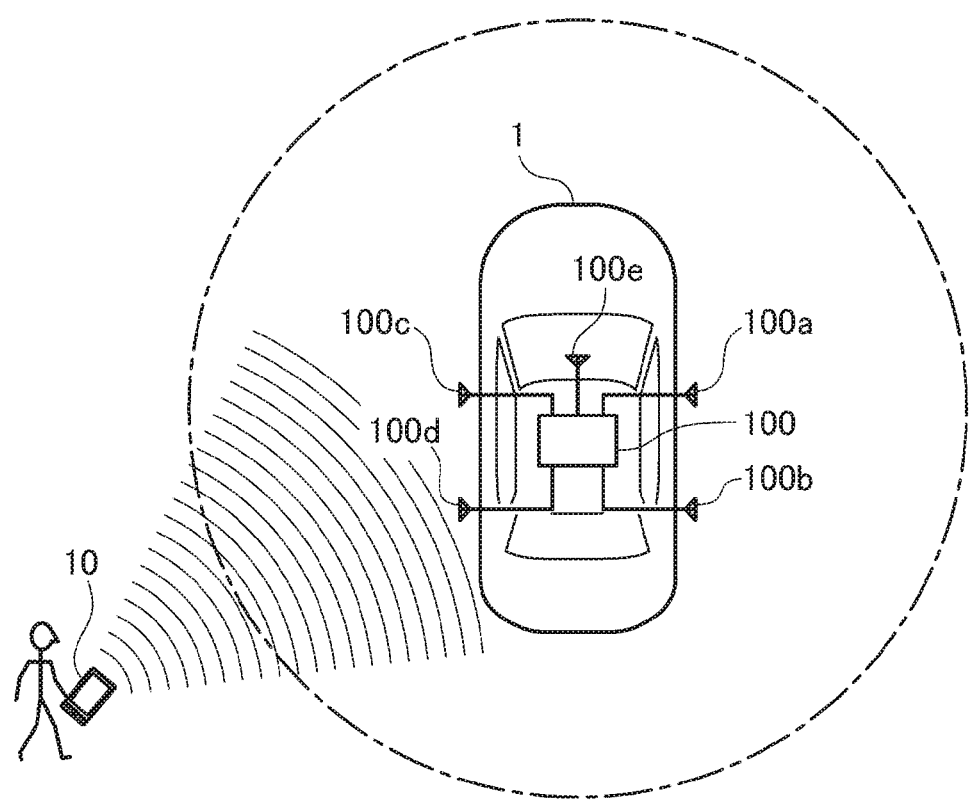
FIG. 1 is an illustrative view showing a rough structure of a vehicle equipped with an in-vehicle wireless communication device according to the present embodiment.

In light of the fact that a mobile wireless information terminal such as a smartphone (hereinafter referred to as a "mobile terminal") is usually carried, an in-vehicle wireless communication device may authenticate the mobile terminal and may provide various services such as unlocking of the door. In this configuration, since the mobile terminal can wirelessly communicate with the in-vehicle wireless communication device even from a distance as compared with the electronic key, there is a possibility that authentication is performed to unlock the door before a person carrying the mobile terminal approaches the vehicle. Therefore, the in-vehicle wireless communication device may detects the distance to the mobile terminal based on a radio wave intensity of a radio wave from the mobile terminal, and may provide various services such as unlocking the door of the vehicle when it is determined that the mobile terminal is present within a predetermined distance.

Further, an in-vehicle wireless communication device may request a mobile terminal to transmit a distance detection radio wave having a predetermined intensity prior to detecting a distance to the mobile terminal, thereby improving a detection accuracy of the distance.

However, even with the above configurations, it is difficult to actually detect information on the distance to the mobile terminal with sufficient accuracy.

An in-vehicle wireless communication device according to an aspect of the present disclosure is to be mounted on a vehicle and includes a calibration information storage configured to store calibration information used in combination with a radio wave intensity of the mobile terminal in a state of identifying the mobile terminal, a wireless communicator configured to perform wireless communication with the mobile terminal in a state of identifying the mobile terminal, a radio wave intensity detector configured to detect the radio wave intensity of a radio wave received from the mobile terminal during the wireless communication, and a distance information detector configured to detect distance information to the mobile terminal based on the radio wave intensity of the radio wave received from the mobile terminal and the calibration information stored for the mobile terminal.

A distance information detection method according to another aspect of the present disclosure is applied to an in-vehicle wireless communication device mounted on a vehicle and detecting distance information to a mobile terminal carried by a user of the vehicle by wirelessly communicating with the mobile terminal. The distance information detection method includes identifying the mobile terminal and performing a wireless communication with the mobile terminal, detecting a radio wave intensity of a radio wave received from the mobile terminal during the wireless communication, determining, when the radio wave intensity is detected, whether calibration information used in combination with the radio wave intensity of the mobile terminal is stored for the mobile terminal whose radio wave intensity is detected, and detecting the distance information to the mobile terminal based on the radio wave intensity and the calibration information when the calibration information is stored.

It is found that a reason why the distance information could not be accurately detected even if the distance information is attempted to be detected on the basis of the radio wave intensity from the mobile terminal is that even if the mobile terminal is instructed to transmit the radio wave with the same radio wave intensity, the radio wave intensity at which the mobile terminal actually transmits the radio wave is different. Therefore, if the calibration information is stored for each mobile terminal and the distance information is detected in consideration of the radio wave intensity and the calibration information, the distance information can be detected with high accuracy.

Hereinafter, embodiments for clarifying the content of the present disclosure will be described. FIG. 1 shows a rough structure of a vehicle 1 equipped with an in-vehicle wireless communication device 100 according to the present embodiment. As shown in the figure, the vehicle 1 is equipped with two vehicle exterior antennas 100a and 100b on a right side surface, for example, on door knob portions of front and rear doors, and two vehicle exterior antennas 100c and 100d on a left side surface, for example, on door knob portions of front and rear doors. In FIG. 1, the vehicle exterior antennas 100a, 100b, 100c, and 100d are shown so as to protrude from the vehicle 1. However, those vehicle exterior antennas are shown so as to protrude for the sake of convenience for the purpose of avoiding difficulty in discriminating the figure. The actual vehicle exterior antennas 100a, 100b, 100c, and 100d are incorporated in the vehicle 1, for example, in the door knob portions of the vehicle 1.

The vehicle exterior antennas 100a, 100b, 100c, and 100d are connected to the in-vehicle wireless communication device 100, and therefore, the in-vehicle wireless communication device 100 can wirelessly communicate with a mobile terminal 10, for example, a smartphone, or the like, which is present outside the vehicle 1 through the vehicle exterior antennas 100a, 100b, 100c, and 100d. As shown in FIG. 1, the mobile terminal 10 periodically transmits radio waves, and the in-vehicle wireless communication device 100 can detect distance information to the mobile terminal 10 based on a radio wave intensity of a radio wave from the mobile terminal 10. In this example, the distance information is, for example, information indicating whether the mobile terminal 10 is approaching the vehicle 1 within a predetermined threshold distance. In FIG. 1, a circle indicated by a dash-dot line surrounding the vehicle 1 represents a range within the threshold distance from the vehicle 1.

Further, the in-vehicle wireless communication device 100 is also connected with a vehicle interior antenna 100e, and can wirelessly communicate with the mobile terminal 10 present in a vehicle compartment of the vehicle 1 through the vehicle interior antenna 100e. Although the number of vehicle interior antenna 100e shown in FIG. 1 is one, multiple vehicle interior antennas 100e may be provided.

As described above, the in-vehicle wireless communication device 100 can detect the distance information on the distance to the mobile terminal 10 (for example, whether the vehicle 1 is present within the predetermined threshold distance from the vehicle 1) based on the radio wave intensity from the mobile terminal 10. However, it is actually difficult for the in-vehicle wireless communication device 100 to detect the distance accurately based only on the radio wave intensity. As a result of investigating the reason, the following facts are found.

Figure 2A:
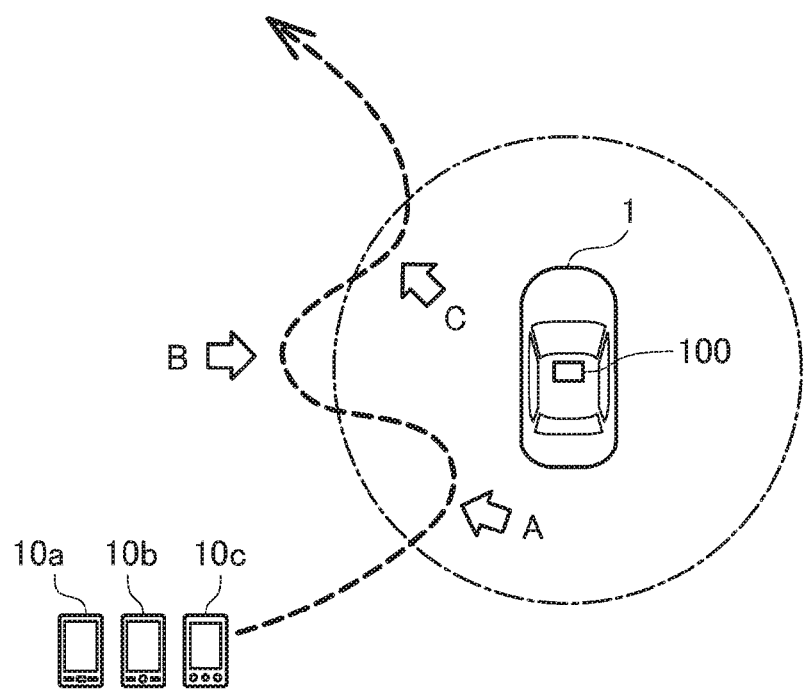
FIG. 2A is an illustrative view showing a reason why the in-vehicle wireless communication device is unable to accurately detect distance information to the mobile terminal.
Figure 2B:
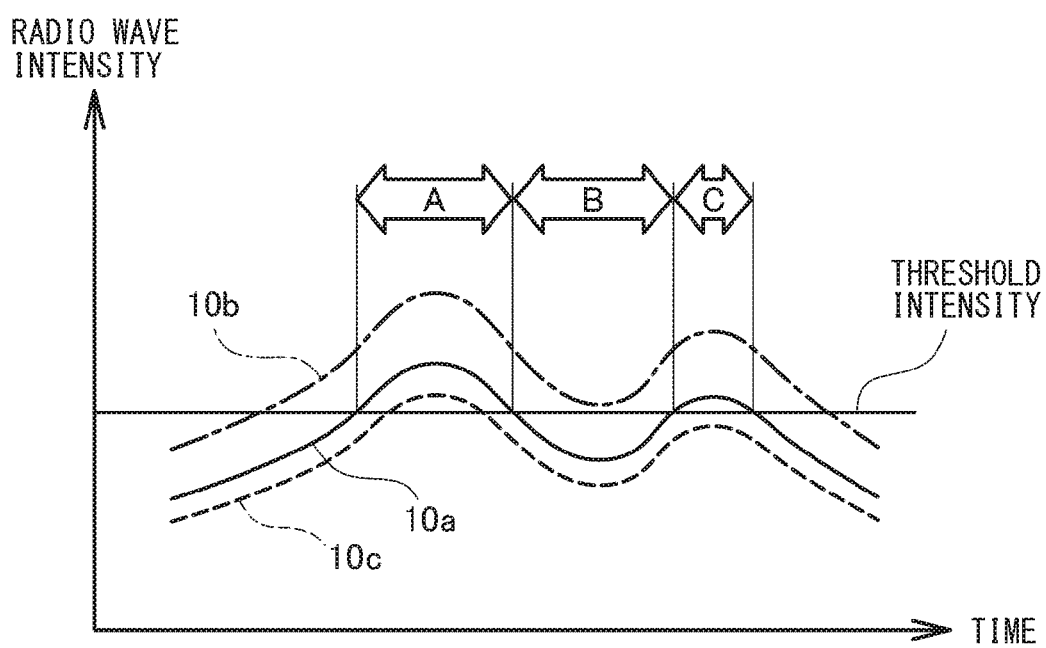
FIG. 2B is a diagram showing measurement results of radio wave intensities for mobile terminals.

FIG. 2A and FIG. 2B show the reason why it is difficult for an in-vehicle wireless communication device 100 to accurately detect the distance information based only on the radio wave intensity from the mobile terminal 10.

For example, as shown in FIG. 2A, it is assumed that three mobile terminals 10a, 10b, and 10c are prepared, and each of the mobile terminals 10a, 10b, and 10c passes through a path indicated by a thick dashed line arrow in the drawing. A circle indicated by a dash-dot line in the drawing represents a range within a threshold distance from the vehicle 1.

In the drawing, the mobile terminals 10a, 10b, and 10c come closer to the vehicle 1 than the threshold distance at a position indicated by an outline arrow A, become farther than the threshold distance at a position indicated by an outline arrow B, and become closer than the threshold distance again at a position indicated by an outline arrow C. Since the radio wave intensity from the mobile terminals 10a, 10b, and 10c increases as the mobile terminals 10a, 10b, and 10c come close to the vehicle 1, it should be possible to determine whether the mobile terminals 10a, 10b, and 10c come close to the vehicle 1 within the threshold distance by comparing the radio wave intensity with a threshold intensity if the threshold intensity of an appropriate magnitude is set in advance.

Further, if a transmission radio wave intensity is specified for the mobile terminals 10a, 10b, and 10c before the in-vehicle wireless communication device 100 detects the radio wave intensity, it should be possible to determine with sufficient accuracy whether the mobile terminals 10a, 10b, and 10c come close to the vehicle 1 within the threshold distance.

Actually, however, it has been found that a difference in the radio wave intensity detected by the in-vehicle wireless communication device is caused by a difference in model and an individual difference of the mobile terminals 10a, 10b, and 10c (even when the transmission radio wave intensity is specified by the in-vehicle wireless communication device 100.

FIG. 2B illustrates measurement results of radio wave intensities of the mobile terminals 10a, 10b, and 10c. This is a result of measuring a change in radio wave intensity by the in-vehicle wireless communication device according to the comparative example when the same person carries the mobile terminal in the same manner and travels at the same speed through a path indicated by the thick dashed line arrow in FIG. 2A. The measurement result indicated by a solid line in the drawing is the measurement result of the mobile terminal 10a, the measurement result indicated by a dash-dot chain line is the measurement result of the mobile terminal 10b, and the measurement result indicated by a dashed line is the measurement result of the mobile terminal 10c.

As is apparent from FIG. 2B, in any of the mobile terminals 10a, 10b, and 10c, the radio wave intensity becomes large at a position coming close to the vehicle 1 (for example, a position indicated by the arrow A or the arrow C in FIG. 2A), and the radio wave intensity becomes small at a position coming far from the vehicle 1 (for example, a position indicated by the arrow B in FIG. 2A), and the tendency of the radio wave intensity to change coincides with each other. However, the magnitude of the radio wave intensity differs among the mobile terminals 10a, 10b, and 10c. For that reason, when the radio wave intensity is simply used, it is difficult to accurately detect the distance information to the mobile terminals 10a, 10b, and 10c.

For example, it is assumed that the threshold intensity is set based on the radio wave intensity of the mobile terminal 10a when it is determined whether the mobile terminal comes close to the vehicle 1 within the predetermined threshold distance by comparing the radio wave intensity with a threshold value. As shown in FIG. 2B, it can be detected with high accuracy whether the mobile terminal 10a comes close to the vehicle 1 within the threshold distance, but it cannot be detected that the mobile terminal 10b having a radio wave intensity larger than that of the mobile terminal 10a moves away from the vehicle 1 at the position indicated by the arrow B in FIG. 2A. Alternatively, it cannot be detected that the mobile terminal 10c having a radio wave intensity smaller than that of the mobile terminal 10a again comes close to the vehicle 1 within the threshold distance at the position indicated by the arrow C in FIG. 2A.

It is considered that the above fact is the reason why it is difficult to secure sufficient accuracy when the distance to the mobile terminal 10 is detected based only on the radio wave intensity. Therefore, the in-vehicle wireless communication device 100 of the present embodiment employs the following method in order to be able to accurately detect the distance information to the mobile terminal 10 based on the radio wave intensity.

Figure 3:
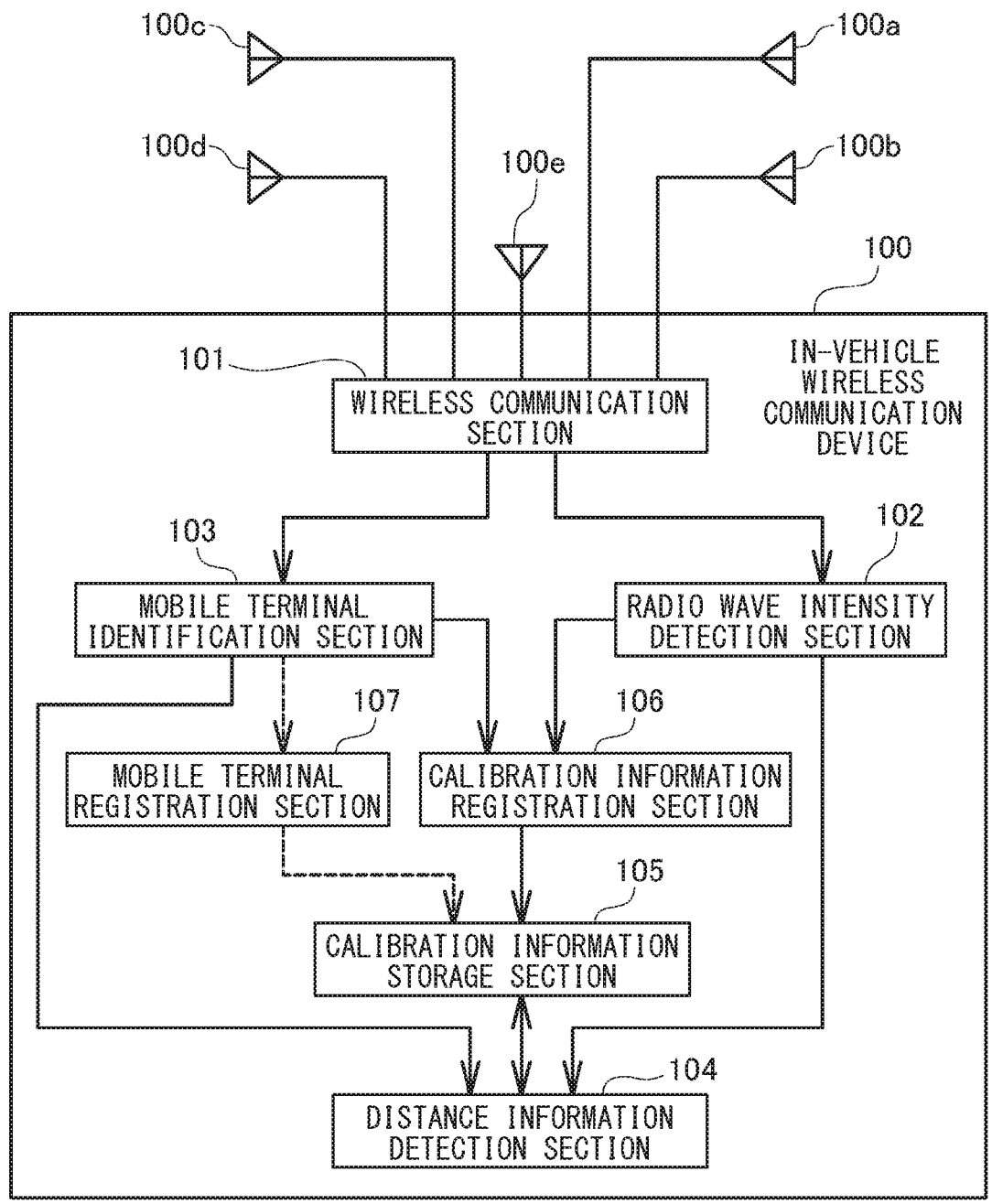
FIG. 3 is a block diagram showing a structure of the in-vehicle wireless communication device according to the present embodiment.

FIG. 3 shows a rough internal structure of the in-vehicle wireless communication device 100 according to the present embodiment. As illustrated, the in-vehicle wireless communication device 100 includes a wireless communication section 101, a radio wave intensity detection section 102, a mobile terminal identification section 103, a distance information detection section 104, a calibration information storage section 105, a calibration information registration section 106, and a mobile terminal registration section 107.

Incidentally, those "sections" are abstract concepts in which the inside of the in-vehicle wireless communication device 100 according to the present embodiment is classified for convenience, focusing on the function provided by the in-vehicle wireless communication device 100 for accurately detecting the distance information to the mobile terminal 10 based on the radio wave intensity from the mobile terminal 10. Therefore, the inside of the in-vehicle wireless communication device 100 is not physically divided into those "sections". Those "sections" can be realized as a computer program executed by a CPU, can be realized as an electronic circuit including an LSI, or can be realized as a combination of a computer program with an electronic circuit.

The wireless communication section 101 can also be referred to as a wireless communicator. The radio wave intensity detection section 102 can also be referred to as a radio wave intensity detector. The mobile terminal identification section 103 can also be referred to as a mobile terminal identifier. The distance information detection section 104 can also be referred to as distance information detector. The calibration information registration section 106 can also be referred to as a calibration information register. The mobile termination registration section 107 can also be referred to as a mobile terminal register.

The wireless communication section 101 is connected to the vehicle exterior antennas 100a, 100b, 100c, and 100d, and can transmit and receive the radio waves to and from the mobile terminal 10 present outside the vehicle 1 through the vehicle exterior antennas 100a, 100b, 100c, and 100d. The wireless communication section 101 is also connected to a vehicle interior antenna 100e, and can transmit and receive the radio waves to and from the mobile terminal 10 present in the interior of the vehicle 1 through the vehicle interior antenna 100e.

The radio wave intensity detection section 102 is connected to the wireless communication section 101, detects the radio wave intensity of the radio wave received by the wireless communication section 101 through the vehicle exterior antennas 100a, 100b, 100c, and 100d or the vehicle interior antenna 100e, and outputs information on the detected radio wave intensity to the distance information detection section 104.

The mobile terminal identification section 103 identifies the mobile terminal 10 by detecting the identification information of the mobile terminal 10 that has transmitted the signal among the signals received by the wireless communication section 101 through the vehicle exterior antennas 100a, 100b, 100c, and 100d or the vehicle interior antenna 100e. Then, the mobile terminal identification section 103 outputs the detected identification information to the distance information detection section 104.

The distance information detection section 104 detects the distance information to the mobile terminal 10 based on the information on the radio wave intensity received from the radio wave intensity detection section 102. In this example, the distance information is information related to the distance from the vehicle 1 to the mobile terminal 10. For example, the distance information may be information indicating the distance itself, or information indicating whether the distance from the vehicle 1 to the mobile terminal 10 is smaller than the predetermined threshold distance.

However, as described above with reference to FIG. 2A and FIG. 2B, since the radio wave intensity transmitted by the mobile terminal 10 is different depending on the difference in model or the individual difference of the mobile terminal 10, even if the received radio wave intensity is the same, if the mobile terminal 10 that transmits the radio wave is different, the actual distance information should be different. Therefore, when the distance information detection section 104 receives the identification information of the mobile terminal 10 from the mobile terminal identification section 103 when detecting the distance information, the distance information detection section 104 refers to the calibration information storage section 105 to acquire the calibration information stored in association with the corresponding identification information. In this example, the calibration information is information used to detect accurate distance information from the radio wave intensity. Specific examples of the calibration information will be described later.

The calibration information storage section 105 stores the calibration information for the mobile terminal 10 in association with the identification information of the mobile terminal 10. The information stored in the calibration information storage section 105 (that is, the information obtained by combining the identification information of the mobile terminal 10 and the calibration information for the identification information) can be stored in advance. However, since the in-vehicle wireless communication device 100 according to the present embodiment includes the calibration information registration section 106 for generating calibration information and registering the calibration information in the calibration information storage section 105, the calibration information can be registered as necessary.

The calibration information registration section 106 receives the radio wave intensity from the radio wave intensity detection section 102, receives the identification information of the mobile terminal 10 from the mobile terminal identification section 103, and generates the calibration information for the mobile terminal 10. Then, the calibration information registration section 106 registers the calibration information in the calibration information storage section 105 in a state in which the calibration information is associated with the identification information of the mobile terminal 10. When the radio wave intensity and the identification information of the mobile terminal 10 are known, the calibration information registration section 106 can register the calibration information in the calibration information storage section 105. However, in the in-vehicle wireless communication device 100 according to the present embodiment, the calibration information is registered for the authorized mobile terminal 10 registered in advance by the mobile terminal registration section 107.

When a predetermined condition is satisfied, the mobile terminal registration section 107 receives the identification information of the mobile terminal 10 from the mobile terminal identification section 103, and registers the identification information in the calibration information storage section 105 as the identification information of the authorized mobile terminal 10. Then, the calibration information registration section 106 registers the calibration information for the identification information of the mobile terminal 10 registered in the calibration information storage section 105, (that is, the authorized mobile terminal 10).

Figure 4:
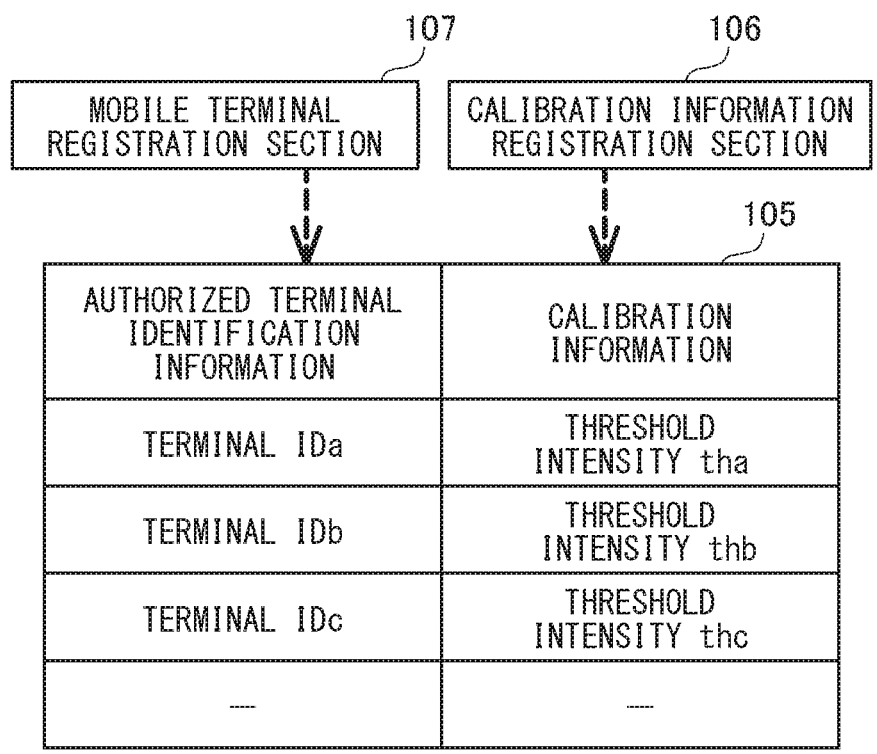
FIG. 4 is an illustrative view showing a state in which calibration information is stored in association with identification information of an authorized terminal.

FIG. 4 conceptually shows a state in which the calibration information is registered in association with the identification information of the authorized mobile terminal 10 in the calibration information storage section 105 of the in-vehicle wireless communication device 100 according to the present embodiment. In the figure, "authorized terminal identification information" is displayed as the identification information of the authorized mobile terminal 10, and three pieces of identification information of the terminal IDa, the terminal IDb, and the terminal IDc are registered as the authorized terminal identification information. Those pieces of authorized terminal identification information are registered by the mobile terminal registration section 107 (refer to FIG. 3) described above.

The calibration information is stored in association with the authorized terminal identification information. In the present embodiment, a threshold intensity (refer to FIG. 2B) for determining whether the mobile terminal 10 is present within the threshold distance is stored as the calibration information. For example, a threshold intensity that is stored as the calibration information for the authorized mobile terminal 10 having the identification information "terminal IDa", and a threshold intensity thb is stored for the authorized mobile terminal 10 having the identification information "terminal IDb". The calibration information registration section 106 registers the calibration information with respect to the authorized terminal identification information registered by the mobile terminal registration section 107. When new authorized terminal identification information is registered by the mobile terminal registration section 107, the calibration information is registered by the calibration information registration section 106 for the authorized terminal identification information.

In the in-vehicle wireless communication device 100 according to the present embodiment, the calibration information is stored for the identification information registered as the authorized mobile terminal 10 (that is, the authorized terminal identification information) in order to avoid a situation in which the number of stored calibration information becomes too large. This is because it is only necessary to detect the distance information accurately with respect to the authorized mobile terminal 10, and it is considered that there is no need to detect the distance information accurately with respect to the non-authorized mobile terminal 10.

In this manner, if the calibration information (in the present embodiment, threshold intensity) is stored in association with the identification information of the mobile terminal 10, the distance information (in the present embodiment, whether the mobile terminal 10 is present within the range of the predetermined threshold distance) can be detected with high accuracy.

For example, when it is assumed that the identification information of the mobile terminals 10a, 10b, and 10c described above with reference to FIG. 2B is the terminal IDa, IDb, and IDc, the threshold intensities tha, thb, and thc are registered for the respective identification information, as shown in FIG. 4. With the above configuration, if the threshold intensities tha, thb, and thc are set to appropriate values, it can be accurately detected whether the mobile terminals 10a, 10b, and 10c are present within the predetermined threshold distance even if the radio wave intensities transmitted by the mobile terminals 10a, 10b, and 10c are different from each other.

Figure 5A:
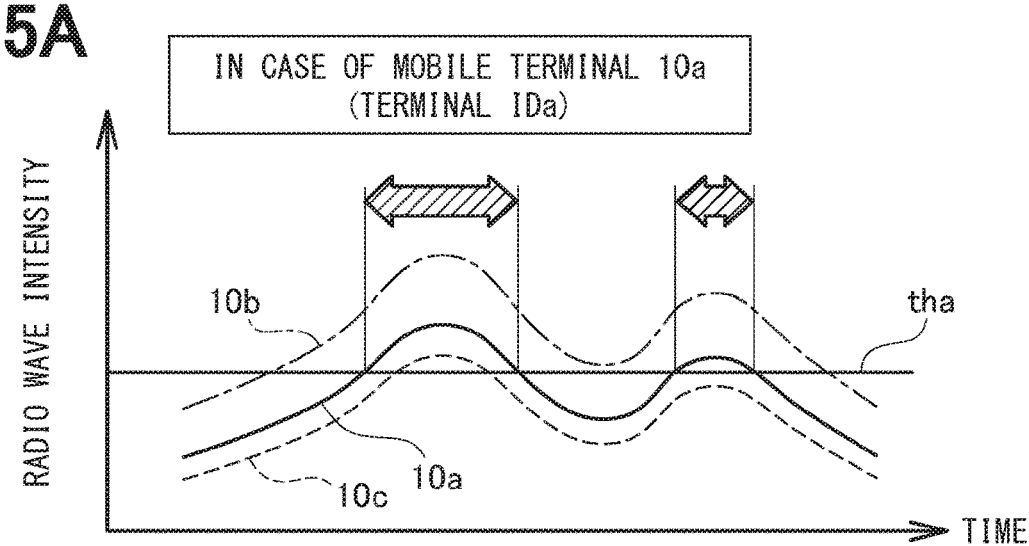
FIG. 5A is an illustrative view (Part 1) showing a reason why the in-vehicle wireless communication device of the present embodiment can accurately detect distance information to a mobile terminal.
Figure 5B:
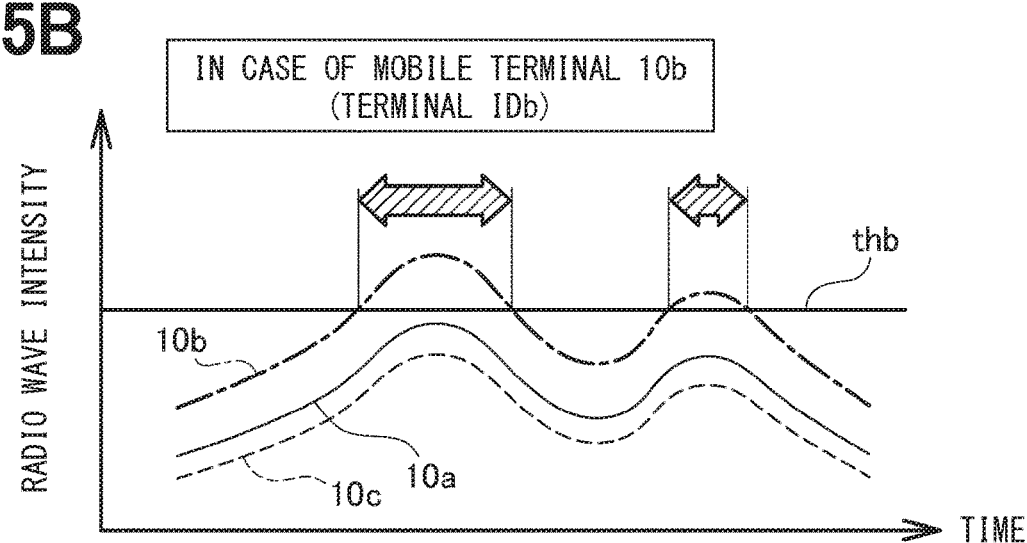
FIG. 5B is an illustrative view (Part 2) showing a reason why the in-vehicle wireless communication device of the present embodiment can accurately detect the distance information to the mobile terminal.
Figure 5C:
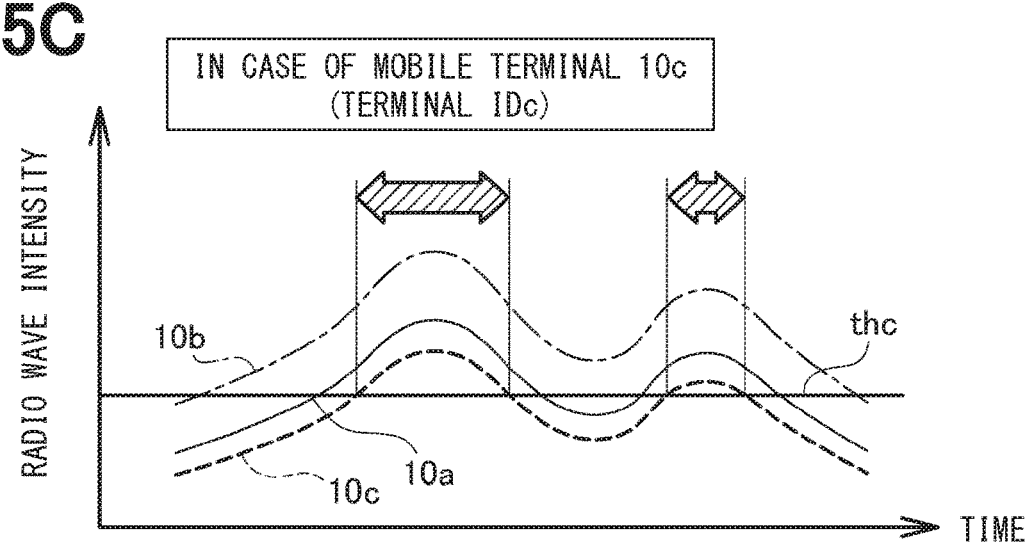
FIG. 5C is an illustrative view (Part 3) showing a reason why the in-vehicle wireless communication device of the present embodiment can accurately detect the distance information to the mobile terminal.

In other words, as shown from FIG. 5A to FIG. 5C, the mobile terminal 10a whose identification information is the terminal IDa is determined with the use of the threshold intensity tha (refer to FIG. 5A), the mobile terminal 10b whose identification information is the terminal IDb is determined with the use of the threshold intensity thb (refer to FIG. 5B), and the mobile terminal 10c whose identification information is the terminal IDc is determined with the use of the threshold intensity thc (refer to FIG. 5C). With the above configuration, as shown from FIG. 5A to FIG. 5C, it can be detected with high accuracy that any of the mobile terminals 10a, 10b, and 10c falls within the threshold distance.

In order to detect the distance information (in the present embodiment, whether the mobile terminal 10 is present within the threshold distance) with high accuracy in this manner, it is prerequisite that appropriate calibration information (in the present embodiment, the threshold intensity) is stored in accordance with the radio wave intensity transmitted by the mobile terminal 10. Such calibration information may be obtained by measuring the radio wave intensity of the mobile terminal 10 in advance, and the obtained result may be written in a memory (not shown) incorporated in the in-vehicle wireless communication device 100. However, in the present embodiment, the in-vehicle wireless communication device 100 generates and registers the calibration information by performing the following process.

Figure 6:
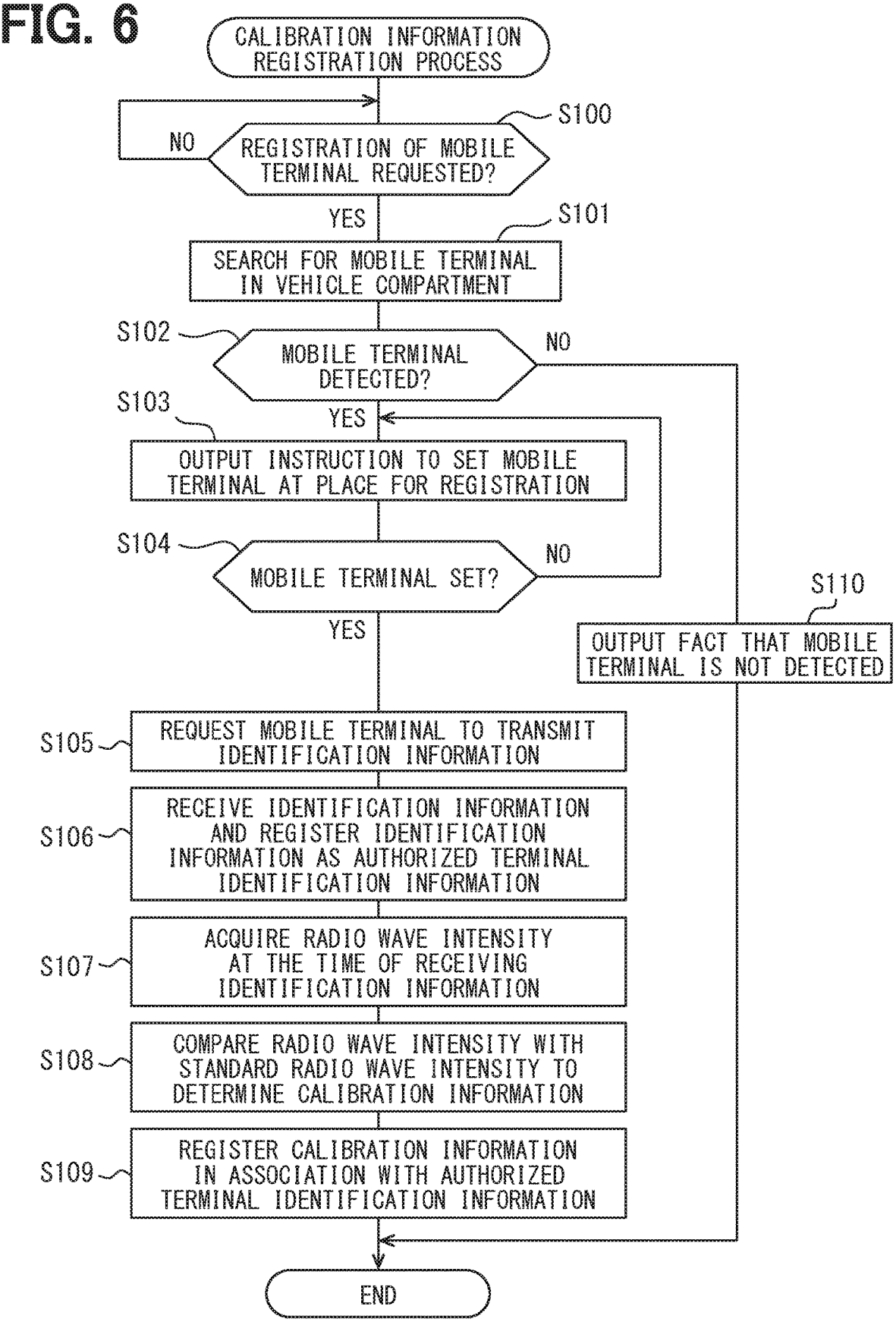
FIG. 6 is a flowchart showing a process of generating and registering calibration information corresponding to identification information of an authorized mobile terminal in the in-vehicle wireless communication device according to the present embodiment.

FIG. 6 shows a flowchart of a calibration information registration process in which the in-vehicle wireless communication device 100 according to the present embodiment generates and registers the calibration information corresponding to identification information of the authorized terminal.

As shown in the figure, in the calibration information registration process, it is first determined whether the registration of the mobile terminal 10 is requested by the user of the vehicle 1 (S100). When the user of the vehicle 1 wants to register the mobile terminal 10 carried by the user in the vehicle 1 as the authorized mobile terminal 10, the user can request the registration of the mobile terminal 10 by performing a predetermined operation on the in-vehicle wireless communication device 100 or the mobile terminal 10.

In the determination of S100, if it is determined that the registration of the mobile terminal 10 is not requested (NO in S100), the same determination is repeated, thereby entering a waiting state waiting until the registration is requested. On the other hand, when it is determined that the registration of the mobile terminal 10 is requested (YES in S100), the mobile terminal 10 present in the vehicle compartment is searched (S101). As described above with reference to FIG. 1, the vehicle interior antenna 100e is provided in the vehicle compartment of the vehicle 1, and it can be determined whether the mobile terminal 10 is present in the vehicle compartment by transmitting a searching radio wave from the vehicle interior antenna 100e toward the vehicle compartment and determining whether a response signal from the mobile terminal 10 is returned.

The reason why the mobile terminal 10 in the vehicle compartment is searched is that it is important for the mobile terminal 10 to be present in the vehicle compartment in order to generate accurate calibration information. This point will be described in detail later.

Next, it is determined whether the mobile terminal 10 is detected in the vehicle compartment (S102). Then, when the response signal from the mobile terminal 10 is not returned, and therefore the mobile terminal 10 is not detected in the vehicle compartment (NO in S102), the calibration information registration process of FIG. 6 is terminated after outputting a message indicating that the mobile terminal 10 is not detected (S110). The fact that the mobile terminal 10 is not detected may be output by using a speaker (not shown) mounted on the vehicle 1, or may be output by using a monitor screen (not shown).

On the other hand, when the mobile terminal 10 is detected in the vehicle compartment (YES in S102), an instruction to set the mobile terminal 10 at a predetermined place for registration is output by using a speaker or a monitor screen (not shown) (S103).

Figure 7:
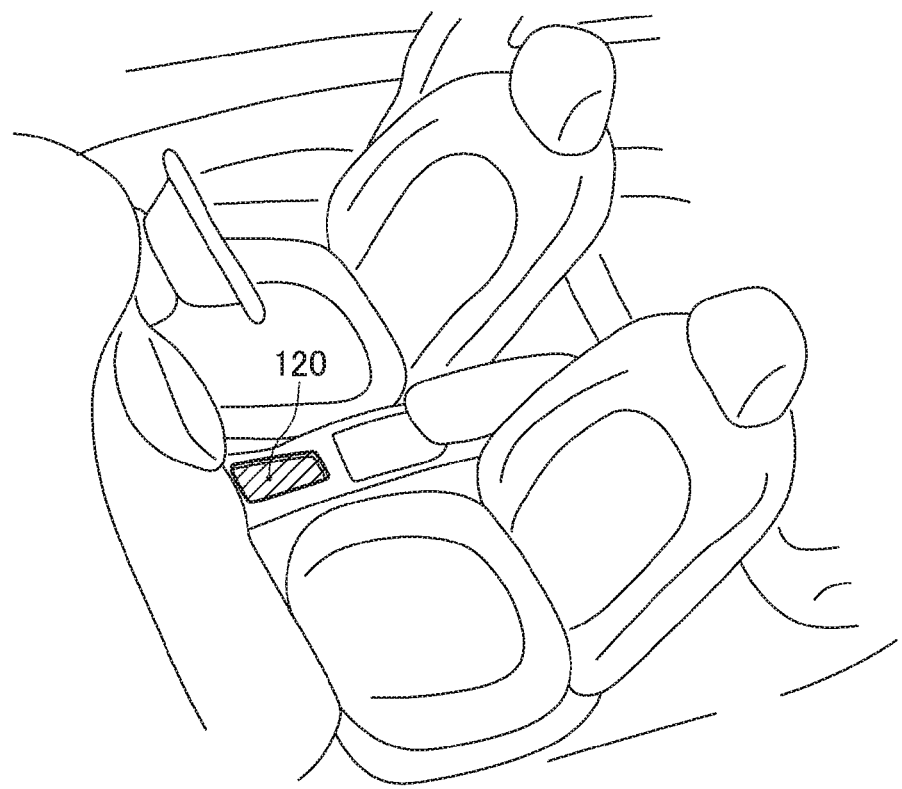
FIG. 7 is an explanatory diagram illustrating a position where a mobile terminal is set to register as an authorized mobile terminal.

In the present embodiment, as shown by hatching in FIG. 7, a recess portion 120 having a small size to which the mobile terminal 10 is fitted is provided below a center console, and when the mobile terminal 10 is registered in the vehicle 1, the mobile terminal 10 is requested to be placed in the recess portion 120.

Next, it is determined whether the mobile terminal 10 is set in a predetermined place for registration (in this example, within the recess portion 120 in FIG. 7) (S104). This determination can be performed, for example, by providing a contact switch at a position to be turned on when the mobile terminal 10 is set in the recess portion 120, and determining whether the contact switch is turned on. Alternatively, an antenna for close communication with the mobile terminal 10 may be provided at a position directly opposite to the mobile terminal 10 when the mobile terminal 10 is set in the recess portion 120 (directly downward of the recess portion 120), and it may be determined whether the mobile terminal 10 is set based on whether a close communication with the mobile terminal 10 can be performed. In the present embodiment, the vehicle interior antenna 100e is disposed immediately below the recess portion 120, and if the radio wave intensity of the mobile terminal 10 detected by the vehicle interior antenna 100e is a certain intensity or more, it is determined that the mobile terminal 10 is set, and if the radio wave intensity does not satisfy the certain intensity, it is determined that the mobile terminal 10 is not set.

As a result, when it is determined that the mobile terminal 10 is not set in the predetermined place for registration (in this example, in the recess portion 120) (NO in S104), after an instruction to set the mobile terminal 10 in the predetermined place for registration is output (S103), it is determined whether the mobile terminal 10 is set, again (S104).

On the other hand, when it is determined that the mobile terminal 10 is set at a predetermined place for registration (YES in S104), a command for requesting the mobile terminal 10 to transmit the identification information with the normal radio wave intensity is transmitted (S105). At that time, the mobile terminal 10 may be requested to transmit the identification information at the maximum radio wave intensity. Alternatively, the mobile terminal 10 may be requested to transmit the identification information at a predetermined radio wave intensity.

When the identification information transmitted from the mobile terminal 10 is received, the identification information is registered as the identification information (that is, the authorized terminal identification information) of the authorized mobile terminal 10 (S106). Since the mobile terminal 10 is installed at a predetermined location for registration, the mobile terminal 10 is less susceptible to disturbance, so that the identification information from the mobile terminal 10 can be reliably received.

When the identification information is received from the mobile terminal 10, the authentication information used for authenticating the mobile terminal 10 may be transmitted from the in-vehicle wireless communication device 100 to the mobile terminal 10. Since the mobile terminal 10 is set at a predetermined place for registration, the authentication information to be transmitted to the mobile terminal 10 can also be reliably transmitted.

Next, the radio wave intensity at the time of receiving the identification information from the mobile terminal 10 is acquired (S107). As described above, since the mobile terminal 10 is set at the predetermined place for registration, the accurate radio wave intensity of the radio wave for transmitting the identification information by the mobile terminal 10 can be acquired without being affected by disturbance.

Then, the acquired radio wave intensity is compared with a standard radio wave intensity stored in advance, to thereby determine the calibration information (in this example, the threshold intensity) for the mobile terminal 10 to be registered (S108). For example, when the acquired radio wave intensity is 10% larger than the standard radio wave intensity, a threshold intensity that is 10% larger than a standard threshold intensity set for the standard radio wave intensity can be calculated and used as the threshold intensity for the mobile terminal 10 to be registered.

Thereafter, the threshold intensity thus determined is associated with the identification information previously registered as the authorized terminal identification information in S106 and registered as the calibration information (S109), and then the calibration information registration process of FIG. 6 is terminated.

As described above, in the present embodiment, the mobile terminal 10 is registered in a state where the mobile terminal 10 is set in the recess portion 120 provided below the center console. The reason is that the mobile terminal 10 is set in the recess portion 120 so as to be able to reliably receive identification information from the mobile terminal 10 without being affected by disturbance, and to accurately detect the radio wave intensity of the radio field transmitted by the mobile terminal 10. Conversely speaking, a place where the mobile terminal 10 is set does not necessarily have to be in the recess portion 120 as long as the place is less susceptible to disturbance. For example, the mobile terminal 10 may be placed at a predetermined place on the dashboard, the mobile terminal 10 may be brought close to a predetermined place on the center console while the user holds the mobile terminal 10 in his hand, or the mobile terminal 10 may be pressed at the predetermined place on the dashboard.

In addition, a charging device for charging the mobile terminal 10 in a non-contact manner may be provided at a predetermined place where the mobile terminal 10 is set for registration, and the mobile terminal 10 may be charged while a process for registering the mobile terminal 10 is performed. When the process for registering the mobile terminal 10 is completed, the mobile terminal 10 is requested to transmit the identification information again, and the radio wave intensity detected at that time is compared with the radio wave intensity detected at the time of registration. As a result, when the radio wave intensity detected at the time of registration is smaller than the radio wave intensity newly detected, an instruction to register the calibration information may be output again after charging the mobile terminal 10.

The above configuration can avoid a situation that the radio wave intensity of the radio wave to be transmitted is reduced and inaccurate update information is registered due to exhaustion of the battery of the mobile terminal 10 to be registered.

In the in-vehicle wireless communication device 100 according to the present embodiment, the calibration information for the identification information (that is, the authorized terminal identification information) of the authorized mobile terminal 10 is registered by executing the above-described calibration information registration process (refer to FIG. 4). Referring to such calibration information, accurate distance information to the authorized mobile terminal 10 can be detected.

Figure 8:
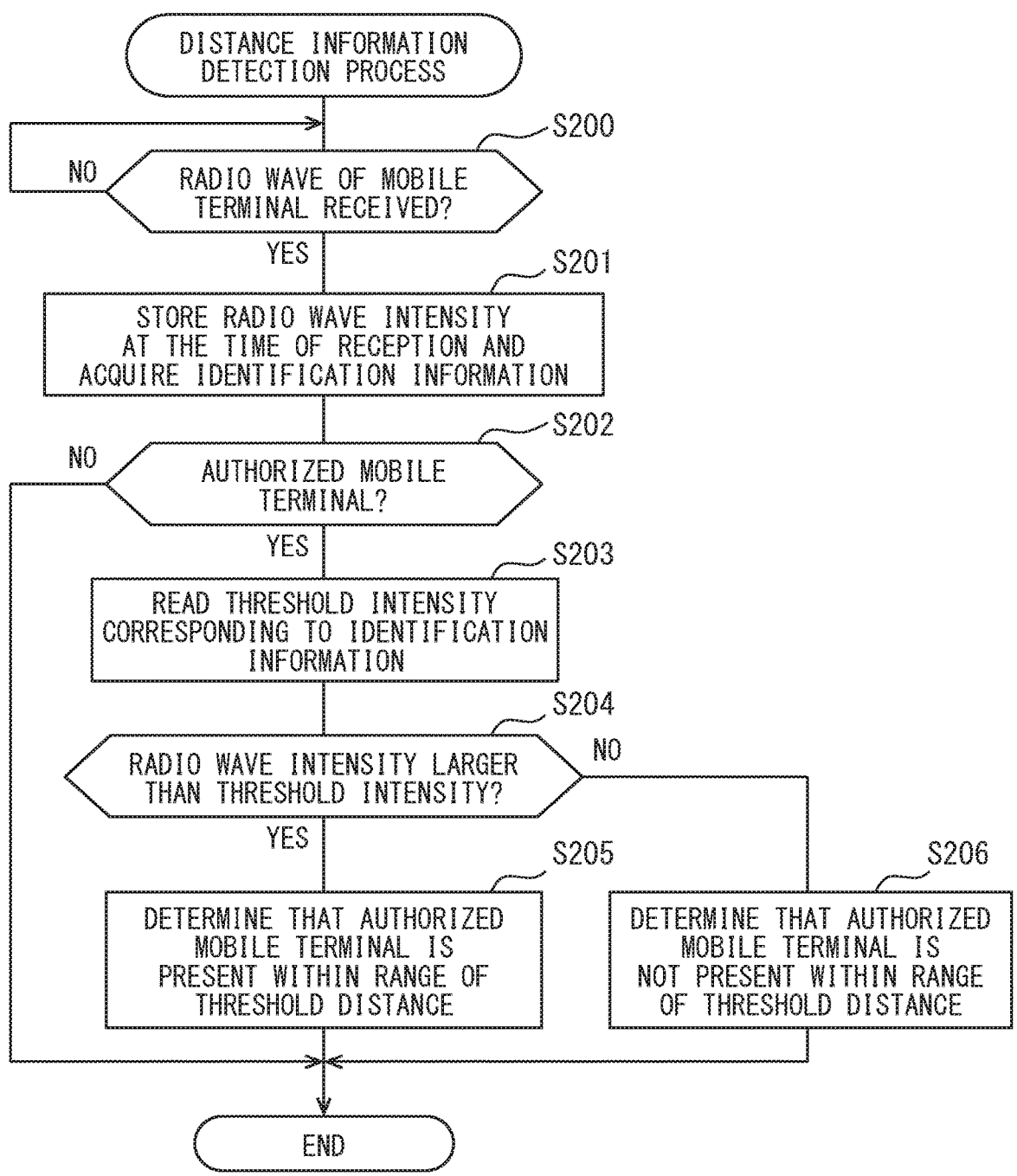
FIG. 8 is a flowchart showing a process of detecting distance information to the authorized mobile terminal based on calibration information in the in-vehicle wireless communication device of the present embodiment.

FIG. 8 is a flowchart of a distance information detection process in which the in-vehicle wireless communication device 100 of the present embodiment detects the distance information to the authorized mobile terminal 10 based on the calibration information.

As shown in the figure, in the distance information detection process, it is first determined whether the radio wave from the mobile terminal 10 is received (S200). Normally, the mobile terminal 10 transmits the radio wave at a predetermined cycle, and the radio wave includes identification information of the mobile terminal 10. Therefore, in S200, it is determined whether the radio wave is received.

As a result, when the radio wave from the mobile terminal 10 is received (NO in S200), it is considered that the mobile terminal 10 is not present around the vehicle 1, and therefore, the determination in S200 is repeated again, to thereby enter a waiting state until the radio wave is received.

Then, when the radio wave from the mobile terminal 10 is received (YES in S200), the radio wave intensity of the received radio wave is stored, and the identification information of the mobile terminal 10 that transmitted the radio wave is acquired (S201). As described above, since the radio wave transmitted by the mobile terminal 10 at the predetermined cycle usually includes the identification information of the mobile terminal 10, the identification information can be acquired from the received radio wave.

Next, it is determined whether the mobile terminal 10 that has transmitted the radio wave is the authorized mobile terminal 10 (S202). In the case of the authorized mobile terminal 10, the identification information (that is, the authorized terminal identification information) should have been registered. Therefore, it is possible to determine whether the mobile terminal 10 is the authorized mobile terminal 10 based on whether the identification information of the mobile terminal 10 has been registered.

As a result, when it is determined that the mobile terminal 10 is an authorized mobile terminal (YES in S202), the threshold intensity stored in association with the identification information (that is, the authorized terminal identification information) is read out (S203).

Then, it is determined whether the radio wave intensity acquired in S201 is larger than the read threshold intensity (S204). Then, when the radio wave intensity is larger than the threshold intensity (YES in S204), it is determined that the authorized mobile terminal 10 is present within the predetermined threshold distance from the vehicle 1 (S205). On the other hand, when the radio wave intensity is smaller than the threshold intensity (NO in S204), it is determined that the authorized mobile terminal 10 is not present within the threshold distance (S206).

As described above, when the authorized mobile terminal 10 is detected (YES in S202), and the distance information indicating whether or not the mobile terminal 10 is present within the predetermined threshold distance is detected (S205, S206), the distance information detection process of FIG. 8 is terminated.

On the other hand, when the mobile terminal 10 from which the radio wave is received is not the authorized mobile terminal 10 (NO in S202), the distance information detection process is terminated without detecting the distance information.

Incidentally, in the distance information detection process according to the present embodiment, the description has been made on the assumption that the distance information is not detected with respect to the mobile terminal 10 that is not authorized, but the distance information may also be detected with respect to the mobile terminal 10 that is not authorized. As a matter of course, since the threshold intensity is not stored for the non-authorized mobile terminal 10, the standard threshold intensity used when generating the calibration information may be substituted for the threshold intensity, and the radio wave intensity of the mobile terminal 10 may be compared with the standard threshold intensity. This makes it possible to detect the distance information even with respect to the non-authorized mobile terminal 10, although the accuracy is not as high as with the authorized mobile terminal 10. Further, it is desirable to output the distance information thus obtained in a state in which the distance information is understood to be reference information.

As described above, in the in-vehicle wireless communication device 100 according to the present embodiment, the distance information to the mobile terminal 10 can be accurately detected based on the radio wave intensity when the radio wave is received from the mobile terminal 10 with respect to the mobile terminal 10 registered as the authorized mobile terminal 10.

Of course, in order to detect accurate distance information, it is prerequisite that the mobile terminal 10 has been registered as the authorized mobile terminal 10. However, since the accurate distance information is required to provide various services such as unlocking the door of the vehicle 1 and illumination of the foot to the user who carries the authorized mobile terminal 10, there is no need to provide accurate distance information for the non-authorized mobile terminal 10. In order to be used as the authorized mobile terminal 10, it is necessary to register the mobile terminal 10 in advance. In this respect, since the in-vehicle wireless communication device 100 according to the present embodiment registers the calibration information of the mobile terminal 10 (the threshold intensity in the embodiment described above) when registering the mobile terminal 10 as described above, the distance information to the mobile terminal 10 can be detected with sufficient accuracy without imposing any burden on the user.

In the present embodiment described above, the threshold intensity is stored for each authorized mobile terminal 10, and when the radio wave intensity from the authorized mobile terminal 10 is detected, the detected radio wave intensity is compared with the threshold intensity stored in association with the mobile terminal 10, to thereby determine whether or the distance to the mobile terminal 10 falls within the threshold distance.

However, as described above with reference to S108 of FIG. 6, the threshold intensity corresponding to the authorized mobile terminal 10 is a threshold value obtained by calibrating the standard threshold intensity using a calibration coefficient of the radio wave intensity obtained from the mobile terminal 10. Therefore, instead of storing the threshold intensity corresponding to the authorized mobile terminal 10, the calibration coefficient for calculating the threshold intensity may be stored as the calibration information corresponding to the authorized mobile terminal 10. When determining whether the distance to the authorized mobile terminal 10 falls within the threshold distance, the calibration coefficient stored as the calibration information is read out from the mobile terminal 10, and the calibration coefficient and the standard threshold intensity are multiplied by each other to calculate the threshold intensity for the mobile terminal 10. Thereafter, whether the distance to the mobile terminal 10 falls within the threshold distance may be determined by comparing the obtained threshold intensity with the radio wave intensity of the radio wave from the mobile terminal 10.

Even in this manner, the accurate distance information about the authorized mobile terminal 10 can be detected, similarly to the embodiment described above.

(Modification)

In the embodiment described above, it has been described that whether the mobile terminal 10 is present within the predetermined threshold distance is detected as the distance information. However, the distance information may be information relating to the distance to the mobile terminal 10, and therefore, the distance to the mobile terminal 10 can be detected as the distance information.

Figure 9:
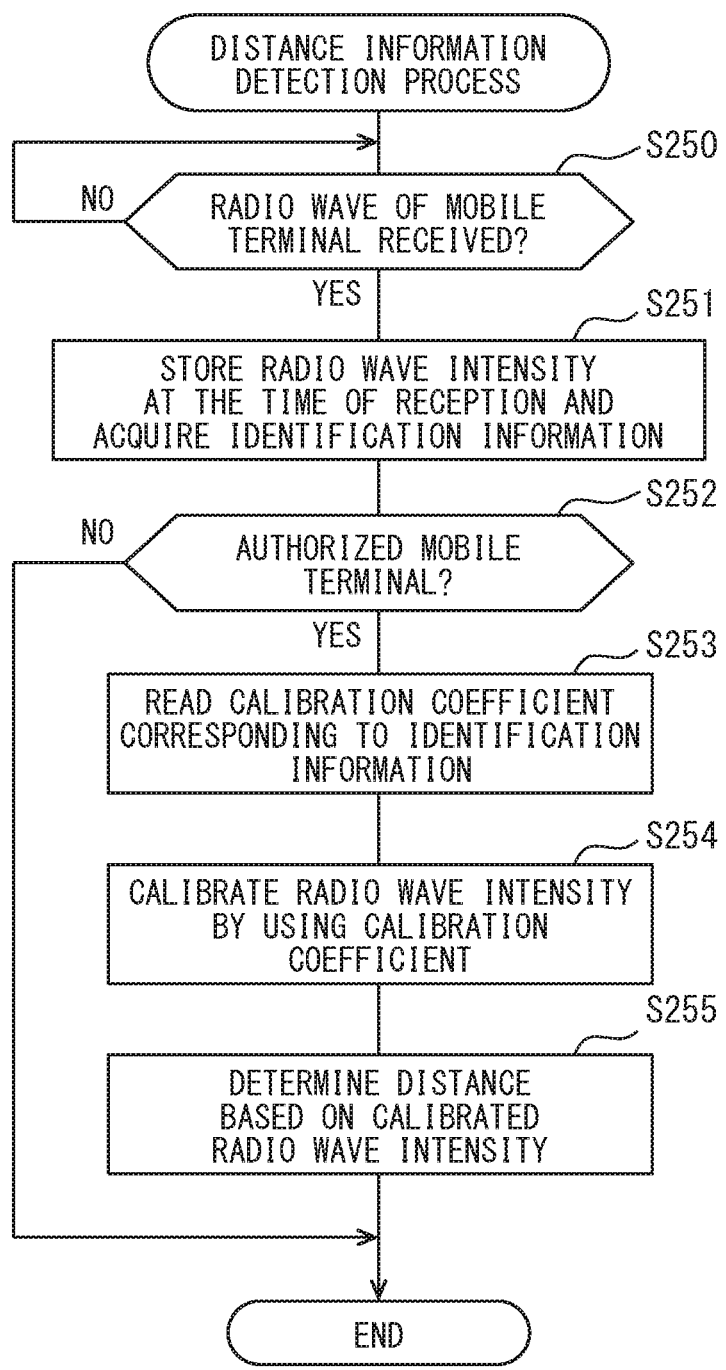
FIG. 9 is a flowchart showing a process of detecting distance information to an authorized mobile terminal based on calibration information in an in-vehicle wireless communication device according to a modification.

FIG. 9 is a flowchart of a distance information detecting process in which the in-vehicle wireless communication device 100 of the modification described above detects the distance information to the authorized mobile terminal 10 based on the calibration information.

As shown in the figure, also in the distance information detection process of the modification, as in the distance information detection process described above with reference to FIG. 8, it is first determined whether the radio wave from the mobile terminal 10 has been received (S250). As a result, if the radio signal from the mobile terminal 10 has not been received (NO in S250), the determination in S250 is determined, so that the in-vehicle wireless communication device 100 is put in a waiting state until receiving the radio wave.

On the other hand, when the radio wave from the mobile terminal 10 has been received (YES in S250), the radio wave intensity of the received radio wave is stored, and the identification information of the mobile terminal 10 that has transmitted the radio wave is acquired (S251). Then, it is determined whether the mobile terminal 10 that has transmitted the radio wave is the authorized mobile terminal 10 (S252). In the case of the authorized mobile terminal 10, since the identification information has been registered, it can be easily determined whether the mobile terminal 10 is the authorized mobile terminal 10.

As a result, when it is determined that the mobile terminal 10 is the authorized mobile terminal 10 (YES in S252), the calibration coefficient stored in association with the identification information (that is, the authorized terminal identification information) is read out (S253). In other words, in the distance information detection process of the present embodiment described above, the threshold intensity stored in association with the authorized terminal identification information is read out (refer to S203 in FIG. 8), however, in the distance information detection process of the modification, the calibration coefficient corresponding to the authorized terminal identification information is read out.

The calibration coefficient can be obtained by a method conforming to a method in which the threshold intensity is obtained with the use of the detected radio wave intensity and the standard radio wave intensity stored in advance in the calibration information registration process of the present embodiment described above. In other words, in S108 of the calibration information registration process according to the present embodiment described above with reference to FIG. 6, the detected radio wave intensity is compared with the standard radio wave intensity, and for example, when the radio wave intensity is 10% larger than the standard radio wave intensity, the threshold intensity which is 10% larger than the standard threshold intensity is calculated.

On the other hand, in the in-vehicle wireless communication device 100 according to the modification, the calibration coefficient for calibrating the detected radio wave intensity to the standard radio wave intensity is calculated by the operation corresponding to S108 during the calibration information registration process of FIG. 6. For example, when the radio wave intensity is 10% larger than the standard radio wave intensity, a calibration coefficient having a value of 0.909 (=1/1.1) is calculated. Then, in the operations corresponding to S109 during the calibration information registration process of FIG. 6, the calibration coefficient obtained in this manner is stored in association with the authorized terminal identification information.

Figures 10, 11:
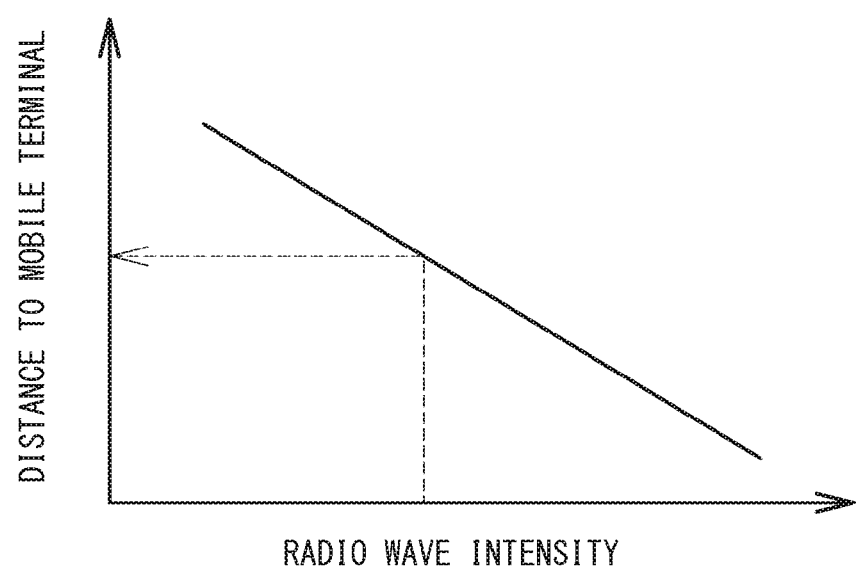
FIG. 10 is an illustrative view showing an example of calibration information stored in association with identification information of an authorized mobile terminal in the in-vehicle wireless communication device according to the modification.
FIG. 11 is an illustrative view showing a state in which the in-vehicle wireless communication device according to the modification detects distance information to the authorized mobile terminal based on a calibrated radio wave intensity.

FIG. 10 exemplifies the calibration coefficient registered in association with the authorized mobile terminal 10 by the in-vehicle wireless communication device 100 of the modification in this manner.

In this way, after the calibration coefficient associated with the authorized mobile terminal 10 is read (S253), the radio wave intensity previously stored in S251 is calibrated with the use of the calibration coefficient (S254). As described above, the calibration coefficient is a coefficient for calibrating that the radio wave intensity at the time of transmitting the radio wave by the mobile terminal 10 differs depending on the difference in model or the individual difference of the mobile terminal 10, and therefore, the radio wave intensity is calibrated by using the calibration coefficient, thereby being capable of removing the difference of the model or the individual difference of the mobile terminal 10.

Thereafter, the distance to the authorized mobile terminal 10 is determined based on the calibrated radio wave intensity (S255). In other words, the in-vehicle wireless communication device 100 according to the modification stores a correspondence relationship between the radio wave intensity and the distance as exemplified in FIG. 11, and the distance to the mobile terminal 10 can be determined with reference to the correspondence relationship.

As described above, when the authorized mobile terminal 10 is detected (YES in S252), and after the threshold to the mobile terminal 10 has been detected (S255), the distance information detection process according to the modification is terminated.

On the other hand, when the mobile terminal 10 from which the radio wave is received is not the authorized mobile terminal 10 (NO in S252), the distance information detection process according to the modification is terminated without detecting the distance to the mobile terminal 10. Needless to say, the distance may also be detected for the mobile terminal 10 that is not authorized. In that case, since the calibration coefficient is not stored for the mobile terminal 10 which is not authorized, the distance is determined without calibrating the radio wave intensity. Since the distance thus obtained is not always accurate, it is desirable to output the distance information in a state in which the distance information is understood to be reference information.

In the in-vehicle wireless communication device 100 according to the modification described above, for the authorized mobile terminal 10, the distance to the mobile terminal 10 can be detected with sufficient accuracy based on the radio wave intensity.

Although the present embodiment and the modifications have been described above, the present disclosure is not limited to the embodiments and the modifications described above, and can be implemented in various modes without departing from the spirit of the present disclosure.

For example, in the embodiment described above, the threshold intensity corresponding to each authorized mobile terminal 10 is stored, and the radio wave intensity when the radio wave is received from the authorized mobile terminal 10 is compared with the threshold intensity corresponding to the mobile terminal 10.

However, the calibration coefficient may be stored for each authorized mobile terminal 10, the radio wave intensity at the time of receiving the radio wave from the authorized mobile terminal 10 may be calibrated using the calibration coefficient corresponding to the mobile terminal 10, and the radio wave intensity after calibration may be compared with a standard threshold intensity. Even in the above manner, it can be detected with high accuracy whether the mobile terminal 10 is present within the threshold distance with respect to the authorized mobile terminal 10.

The flowcharts or the processes of the flowcharts described in the present disclosure are configured by a plurality of sections (or steps), and each section is represented as S100, for example. Furthermore, each section may be divided into a plurality of sub-section, while a plurality of sections may be combined into one section. In addition, each section configured in the above manner may be referred to as a circuit, a device, a module, or a means.

Also, each or a combination of the plurality of sections may be implemented as (i) a section of software in combination with a hardware section (for example, a computer), as well as (ii) a section of hardware (for example, an integrated circuit, a wired logic circuit), with or without the functionality of the associated device. Further, the hardware section can be configured inside a microcomputer.

Although the present disclosure has been described in accordance with the examples, it is understood that the present disclosure is not limited to such examples or structures. The present disclosure encompasses various modifications and variations within the scope of equivalents. In addition, various combinations and configurations, as well as other combinations and configurations that include only one element, more, or less, are within the scope and spirit of the present disclosure.

What is claimed is:

1. An in-vehicle wireless communication device to be mounted on a vehicle, comprising:
   a calibration information storage configured to store calibration information used in combination with a radio wave intensity of a mobile terminal in a state of identifying the mobile terminal;
   a wireless communicator configured to perform wireless communication with the mobile terminal in a state of identifying the mobile terminal;
   a radio wave intensity detector configured to detect the radio wave intensity of a radio wave received from the mobile terminal during the wireless communication;
   a distance information detector configured to detect distance information to the mobile terminal based on the radio wave intensity of the radio wave received from the mobile terminal and the calibration information stored for the mobile terminal;
   a mobile terminal register configured to request of the mobile terminal that the mobile terminal transmit identification information with a predetermined intensity, to receive the identification information form the mobile terminal by wireless communication with the mobile terminal through the wireless communicator, and to register the identification information as identification information of an authorized mobile terminal; and
   a calibration information register configured to generate the calibration information for the authorized mobile terminal based on the radio wave intensity detected by the radio wave intensity detector at a time of receiving the identification information of the authorized mobile terminal, and then register the calibration information for the authorized mobile terminal in the calibration information storage.

2. The in-vehicle wireless communication device according to claim 1, wherein
the distance information detector is configured to detect, as the distance information, whether the distance to the mobile terminal is smaller than a predetermined threshold distance by comparing the radio wave intensity with a predetermined threshold intensity, and
the calibration information storage is further configured to store, as the calibration information, information for calibrating either the radio wave intensity or the threshold intensity.

3. The in-vehicle wireless communication device according to claim 1, wherein
each of the calibration information storage, the wireless communicator, the radio wave intensity detector, and the distance information detector is realized as a computer program executed by a processor, an electronic circuit, or a combination of a computer program with an electronic circuit.

4. A distance information detection method to be applied to an in-vehicle wireless communication device mounted on a vehicle, comprising:
requesting of a mobile terminal that the mobile terminal transmit identification information with a predetermined intensity, receiving the identification information from the mobile terminal, detecting a radio wave intensity at a time of receiving the identification information, and registering the identification information as identification information of an authorized mobile terminal;
generating calibration information for the authorized mobile terminal based on the radio wave intensity detected at the time of receiving the identification information and then storing the calibration information for the authorized mobile terminal;
identifying the mobile terminal and performing wireless communication with the mobile terminal;
detecting a radio wave intensity of a radio wave received from the mobile terminal during the wireless communication;
determining, when the radio wave intensity is detected, whether the calibration information used in combination with the radio wave intensity of the mobile terminal is stored for the mobile terminal whose radio wave intensity is detected; and
detecting the distance information to the mobile terminal based on the radio wave intensity and the calibration information when the calibration information is stored.

* * * * *